J. C. CAKE.
PORTABLE ROTARY OVEN BOTTOM.
APPLICATION FILED JAN. 4, 1909.
920,109.
Patented May 4, 1909.
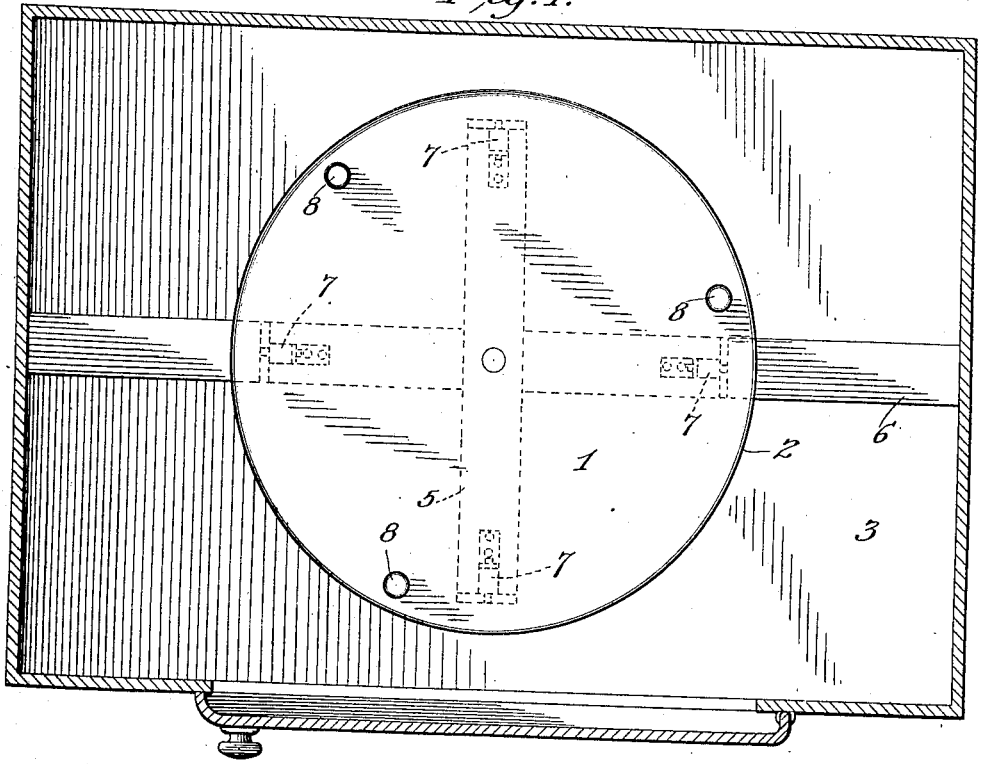
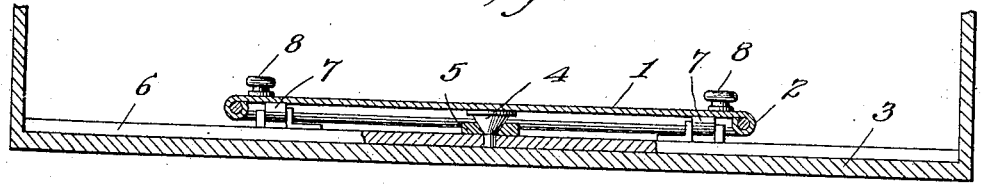
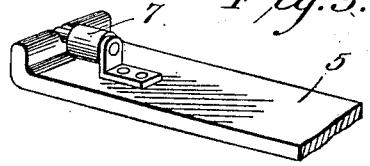
Witnesses
M. C. Lyddane
J. C. L. Mulhall
Inventor
John C. Cake
By Joshua R. H. Potts
Attorney

UNITED STATES PATENT OFFICE.

JOHN C. CAKE, OF NORRISTOWN, PENNSYLVANIA.

PORTABLE ROTARY OVEN-BOTTOM.

No. 920,109.  Specification of Letters Patent.  Patented May 4, 1909.

Application filed January 4, 1909. Serial No. 470,665.

*To all whom it may concern:*

Be it known that I, JOHN C. CAKE, a citizen of the United States, residing at Norristown, in the county of Montgomery and State of Pennsylvania, have invented certain new and useful Improvements in Portable Rotary Oven-Bottoms, of which the following is a specification.

My invention relates to an improved portable rotary oven bottom, the object of the invention being to provide an improved portable oven bottom which can be sold to the trade and be placed in any ordinary oven, and provide a rotary support for dishes during the cooking operation.

A further object is to provide improvements of this character which can be readily placed in position, or removed from an oven, which are extremely simple and inexpensive in construction, which can be readily manipulated to move a cooking utensil throughout the oven or bring it to the door, and which will be strong and durable in use.

With these and other objects in view, the invention consists in certain novel features of construction, and combinations, and arrangements of parts as will be more fully hereinafter described and pointed out in the claim.

In the accompanying drawings, Figure 1, is a plan view illustrating the application of my improvements. Fig. 2, is a view in longitudinal section, and Fig. 3, is a detail perspective view of an end of one of the supporting bars.

1 represents a rotary disk or platform having a turned over edge constituting a strengthening bead 2, and forming a strong support to constitute a rotary bottom for the oven 3, as shown in Fig. 1. This disk has secured at its center a depending conical pin 4, having a thrust bearing in a cross bar 5. This cross bar 5 is secured across a similar bar 6 at right angles thereto, and together these bars 5 and 6 constitute a support for the rotary bottom 1, one of said bars being sufficiently longer than the disk is wide, to engage the end walls of the oven, and prevent displacement of the rotary bottom, while the latter is being turned to position the utensils in the oven. These bars 5 and 6 are provided with mountings for rollers 7, upon which the rotary disk 1 is supported, so as to afford, in effect, a roller bearing for the disk and allow the latter to be freely turned. The disk 1 has a number of knobs, or hand holds 8 secured thereto at regular intervals around its edge to facilitate the turning of the disk, and any suitable hook or other device may be used to engage these knobs, so as to turn the disk without burning the hands.

My improvements are designed for use with any ordinary oven and may be quickly placed in position in the oven, and effectually serve as a rotary oven bottom, enabling the utensils to be brought to the door in convenient reach, so as to overcome the liability of the cook's hands becoming burned, and enable the utensils to be moved to various parts of the oven to receive the desired heat.

Various slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In combination with an oven, a bar extending throughout the length of the oven and supported on the oven bottom at the center thereof, a bar shorter than the first mentioned bar and secured midway its ends across the first mentioned bar having a conical socket therein and upturned ends, a circular plate or disk, a depending conical journal at the center of said plate or disk located in the socket in the bar, rollers on the ends of the shorter bar, supported partly by said upturned ends, and rollers between the ends of the longer bar, all of said rollers disposed below and near the outer edge of said disk or plate, and knobs on the upper face of said disk or plate.

In testimony whereof I have signed my name to this specification in the presence of two subscribing witnesses.

JOHN C. CAKE.

Witnesses:
KATE A. THOMAS,
J. A. L. MULHALL.